(12) United States Patent
Bogacki et al.

(10) Patent No.: US 6,334,950 B1
(45) Date of Patent: Jan. 1, 2002

(54) AUTOMATED OIL FILTER REPLACEMENT ASSEMBLY

(76) Inventors: Frank J. Bogacki, 1527 Pasadena Dr., Erie, PA (US) 16505; Andrew Raymond Spriegel, 703 W. Arlington Rd., Erie, PA (US) 16509

( * ) Notice: Subject to any disclaimer, the term of this patent is extended or adjusted under 35 U.S.C. 154(b) by 0 days.

(21) Appl. No.: 09/428,360

(22) Filed: Oct. 28, 1999

(51) Int. Cl.[7] .............................................. F01M 11/03
(52) U.S. Cl. ........................ 210/97; 210/90; 210/138; 210/168; 210/171; 210/340; 210/416.5; 210/424; 210/DIG. 17; 123/196 A
(58) Field of Search ........................ 210/90, 97, 138, 210/168, 171, 241, 340, 341, 416.5, 424, DIG. 17, 132, 131, 103, 107, 456, 330; 123/196 A; 184/6.24; 196/46.1

(56) References Cited

U.S. PATENT DOCUMENTS

| | | | |
|---|---|---|---|
| 3,341,019 A | * | 9/1967 | Florkowski |
| 3,572,507 A | * | 3/1971 | Juskevic |
| 3,900,401 A | * | 8/1975 | Oliver et al. |
| 4,033,870 A | * | 7/1977 | Parquet et al. |
| 4,246,115 A | * | 1/1981 | Swank |
| 5,200,077 A | * | 4/1993 | NcNeice et al. |
| 5,968,371 A | * | 10/1999 | Verdegan et al. |
| 6,126,818 A | * | 10/2000 | Duerrstein et al. |

FOREIGN PATENT DOCUMENTS

| | | | |
|---|---|---|---|
| DE | 3313539 A | * | 10/1984 |
| JP | 06-146835 | * | 5/1994 |

* cited by examiner

*Primary Examiner*—Joseph W. Drodge
*Assistant Examiner*—Terry K. Cecil
(74) *Attorney, Agent, or Firm*—Robert L. Wolter, Esq.; Beusse Brownlee Bowdoin & Wolter, PA

(57) ABSTRACT

An automatic oil filter replacement assembly for a locomotive including a plurality of oil filters mounted within a cartridge. The filters are mounted within the chamber. An indexing plate, mounted to the cartridge, has a single portal for alignment within a selected chamber and filter. The operating system of the locomotive is adapted so an operator may remotely rotate the indexing plate a given distance after certain set parameters have been reached, so a clean filter, or filters, replace exhausted filters.

12 Claims, 4 Drawing Sheets

AUTOMATED OIL FILTER REPLACEMENT ASSEMBLY

BACKGROUND OF THE INVENTION

This invention relates generally to locomotive diesel engines; and more particularly to the oil lubrication systems used with the locomotive diesel engines.

Oil filters in any internal combustion engine extract foreign debris, or liquids from oil. The oil filters are disposed between a reservoir, or oil sump pump, and the engine. Oil travels from the sump pump through the filter to the engine where the oil lubricates various moving parts, and reduces friction and heat generated from the operation of the engine. Locomotives generally utilize a single oil filter or a single set of oil filters within an oil lubrication system.

However, oil filters have a finite life. Over a period of time the oil filters must be replaced after the filters are no longer effective. The filters may become clogged with filtered debris, or often times the filter media has deteriorated to such a state that the filter media can no longer effectively strain the oil. The life of an oil filter has usually been predetermined, so after a given time interval the oil filters are changed, and oil is purged from the locomotive For instance, locomotives may be maintained every ninety (90) days, at which time the oil filters are changed.

In addition, certain oil conditions can be monitored during the course of operation of the locomotive which may provide some indication of the performance of the oil and oil filters. For example, the oil pressure within the oil lubrication system is continuously monitored. A significant drop in the oil pressure may indicate that the oil filters have deteriorated, or that the oil filter is clogged. In order to avoid any damage to the locomotive engine the oil filters are changed.

In order to change the filters, the locomotive must be stopped and serviced. In addition, to the extent that a locomotive is serviced according to scheduled time intervals, a locomotive may be serviced as much as five times, or more, in a single year. Such downtime can be expensive for the locomotive owners. Freight locomotives that are not operational, cost money because this means travel time that is not utilized for carrying freight.

SUMMARY OF THE INVENTION

By increasing the maintenance cycles of the oil filters, or eliminating unscheduled maintenance, the locomotive "track" time is increased, thereby increasing the overall profitability of the locomotive and its operation. In order to accomplish this desired result, a plurality of oil filters are supported in the oil lubrication system of the locomotive. During the operation of the locomotive, an oil filter, or filters, is selected from the plurality of oil filters which is in fluid communication with an oil reservoir and the engine. The operating system of the locomotive monitors, either continuously or periodically, various conditions of the locomotive and/or oil lubrication systems. Certain parameters are identified to which the operating system responds to change the filters during the operation of the locomotive.

The embodiment disclosed herein includes a cartridge that supports the plurality of oil filters. The cartridge has a plurality of chambers and a filter is secured in sealing relationship with the cartridge in each chamber. The indexing plate includes at least one portal aligned with the selected oil filter.

The locomotive operating system monitors various internal parameters of the locomotive and/or the oil lubrication system, including mileage, kilowatt hours, and/or oil pressure. The oil filter is determined to function within condemning limits. If a parameter has reached a selected limit or set point, the indexing plate is activated to rotate a given interval, so the portal, or portals, is aligned with the next chamber containing a clean oil filter, or filters. This sequence is maintained until all filters have been used.

The invention is not intended to be limited to the above described embodiment but may include any such embodiment that encourages the replacement of intended oil filter during the operation of the locomotive. For instance, the oil may be supplied to a plurality of oil filters via a manifold pipe system. A plurality of valves are disposed along the manifold, which valves are opened and closed to direct oil flow to selected filters.

This filter assembly and procedure shall extend the time period between maintenance of the locomotives which translates into more "track" time for a locomotive. In addition, the filter assembly avoids the necessity of unscheduled stops due to unexpected problems in the oil lubrication system detected by monitoring the performance and operation of the oil lubrication.

DETAILED DESCRIPTION OF THE DRAWINGS

Figure 1:
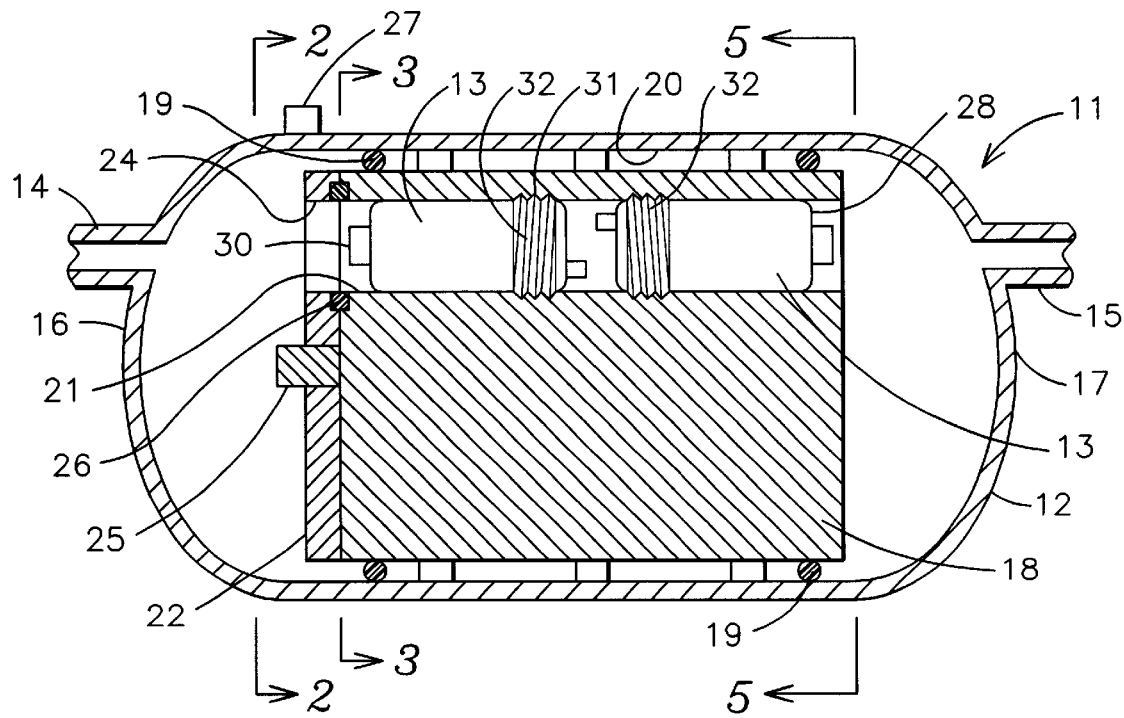
FIG. 1 is a side expanded view of an embodiment of the automated oil filter replacement assembly.

An embodiment of the automated oil filter replacement assembly 11 (the filter assembly or the assembly) is generally illustrated in FIG. 1. The assembly 11 includes a housing 12 within which a plurality of oil filters 13 are supported. Oil is pumped into the housing through an oil intake line 14, at a front end 16 of the housing 12. Filtered oil exits the housing 12 through an oil exit line 15 attached to the rear end 17 of the housing 12.

Figure 8:
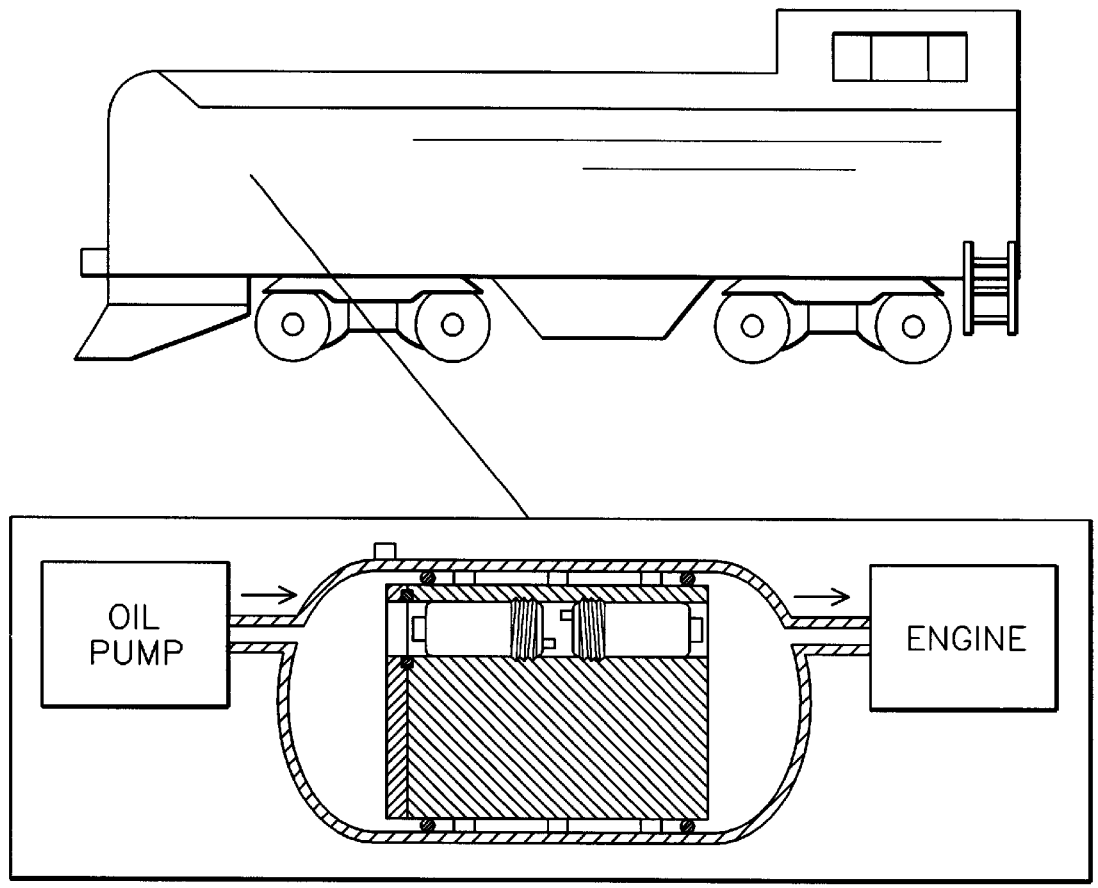
FIG. 8 is an exploded view of the oil filter assembly on a vehicle and connected to the oil pump and engine.

FIG. 8 shows the oil filter assembly 11 on a vehicle as a locomotive 40. An oil pump 41 is used to drive oil through the oil filter assembly 11 where oil is filtered before going to the engine 42.

Figure 2:
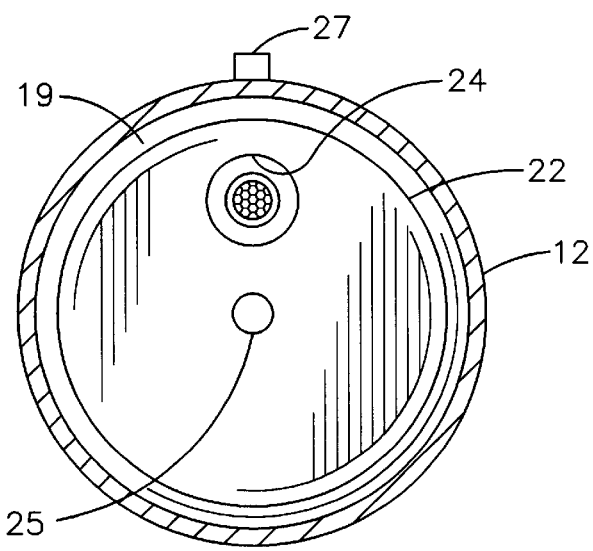
FIG. 2 is a front elevation view of the cartridge and indexing plate.

A cartridge 18, mounted within the housing 12, holds the oil filters 13. In the embodiment illustrated in FIGS. 1–3, the cartridge 18 has a cylindrical shape. Accordingly, the housing 12 takes on a cylindrical configuration. The cartridge 18 is secured within the housing 12 to support the oil filters 13. As will be explained in more detail below, the cartridge 18 is secured in sealing relationship between the cartridge 18 and an interior surface 20 of housing 12 by at least one O-ring 19.

Oil filter 13 is secured within a corresponding chamber 21 in the cartridge 18. As in a typical oil filter installation the filter casing has a threaded end 32 for securing the filter 13 in mating relationship with the interior threaded surface 31 of a respective chamber 21.

Figure 3:
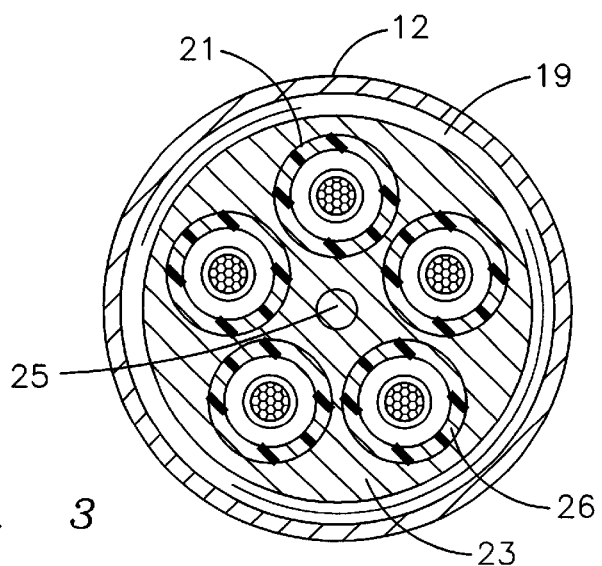
FIG. 3 is a front section view taken along line 3—3 in FIG. 1.
Figure 4:
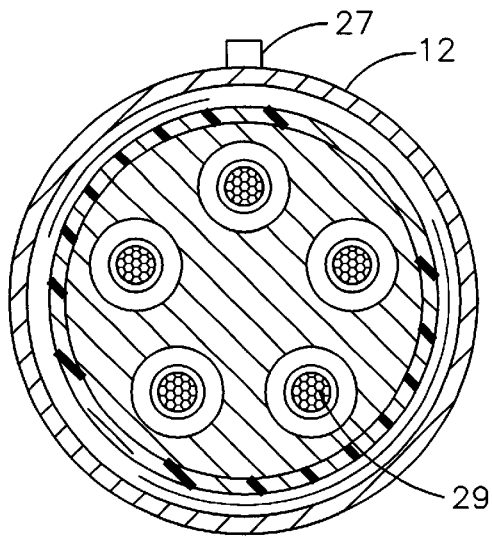
FIG. 4 is a rear view of the cartridge.

In the embodiment shown in FIG. 3, the chambers 21 are annularly spaced equidistance apart on the housing 12. The arrangement of the chambers 21 depends on the filter arrangement of a particular locomotive. As shown in FIG. 1, two oil filters 13 are arranged in series within a chamber 12. The cartridge 18 shown in FIGS. 1 and 3 includes five chambers 21. The number of chambers 21 employed within the housing may vary according to the length of the maintenance cycle desired.

An oil filter indexing plate 22 (the "indexing plate") is mounted to a front surface 23 of the cartridge 18, and is rotatable with respect to the cartridge 18. The indexing plate 22 has a single portal 24 for alignment with a selected chamber 21 on the cartridge 12. The indexing plate 22 is mounted on an axle and bearing assembly 25 and rotates with respect to the cartridge 18. An o-ring 26 extends circumferentially along the portal 24 to seal the chamber 21 and oil filter 13, and prevent oil from bypassing the oil filters 13, in addition to the o-rings 19 disposed between the housing 12 and cartridge 18. Alternatively, an o-ring 26 could be placed over each chamber opening to accomplish the same effect, as shown in FIG. 3. Thus, in either instance, as the indexing plate 22 is rotated to a selected chamber 21, the oil filter 13 and chamber 21 are sealed for oil flow.

The size of the filter assembly 11 may very according to various factors including, but not limited to, the size of the oil filters 13 and arrangement. Oil filter 13 used in some locomotives may be one foot in length and approximately ten inches in diameter. Thus, the cartridge illustrated in FIG. 3, at least two feet in length, or sufficiently large to support two oil filters 13 aligned end-to-end. The cartridge 18 has a diameter of about two feet. The diameter of the housing 12 is only slightly greater than the diameter of the cartridge 12, and any dimension there between is sealed by the o-ring 19. The housing 12 is approximately three feet long with the cartridge 18 centered within the housing 12.

Figure 5:
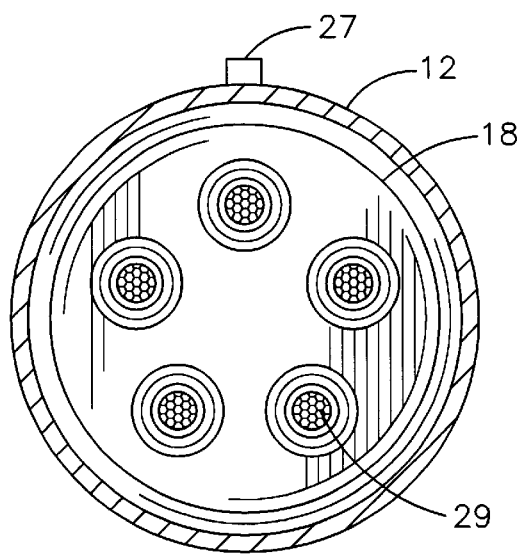
FIG. 5 is a rear sectional view taken along line 5—5 in FIG. 1.
Figure 6:
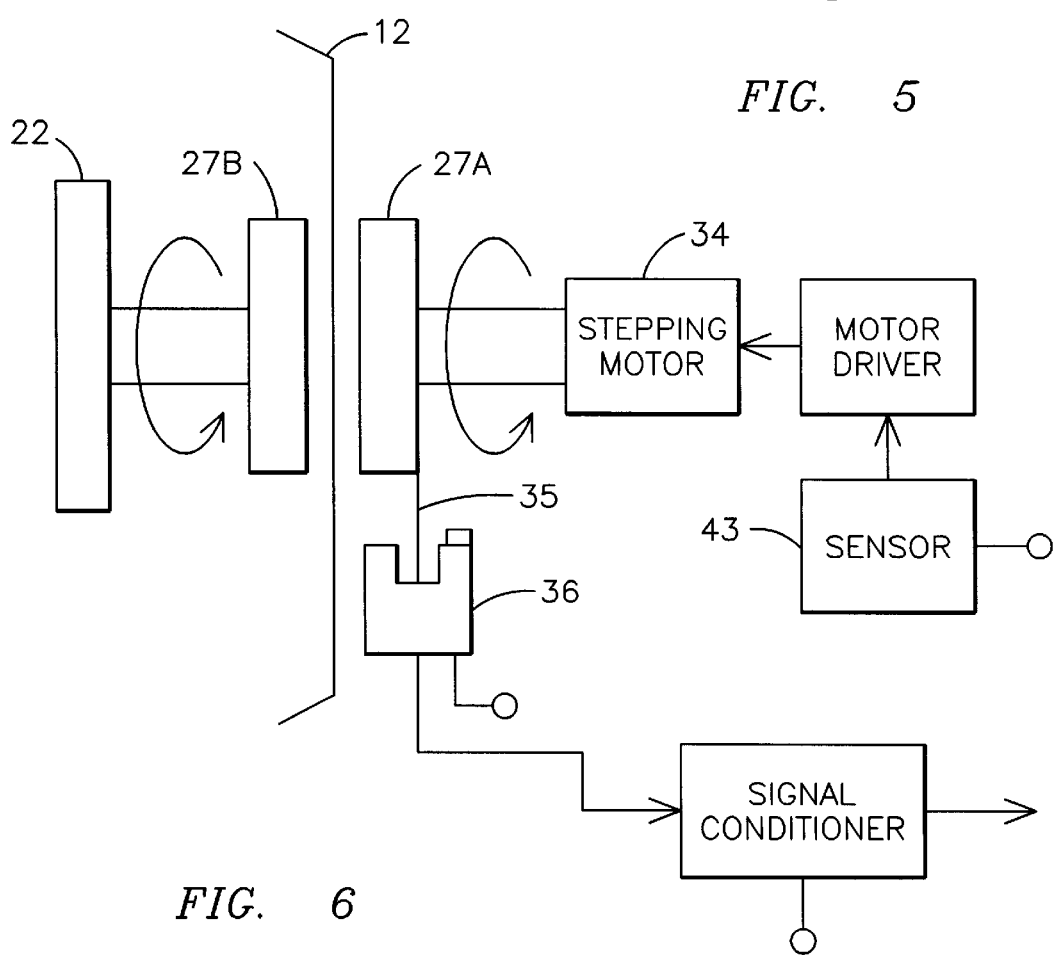
FIG. 6 is a schematic of the indexing drive and indexing plate.
Figure 7:
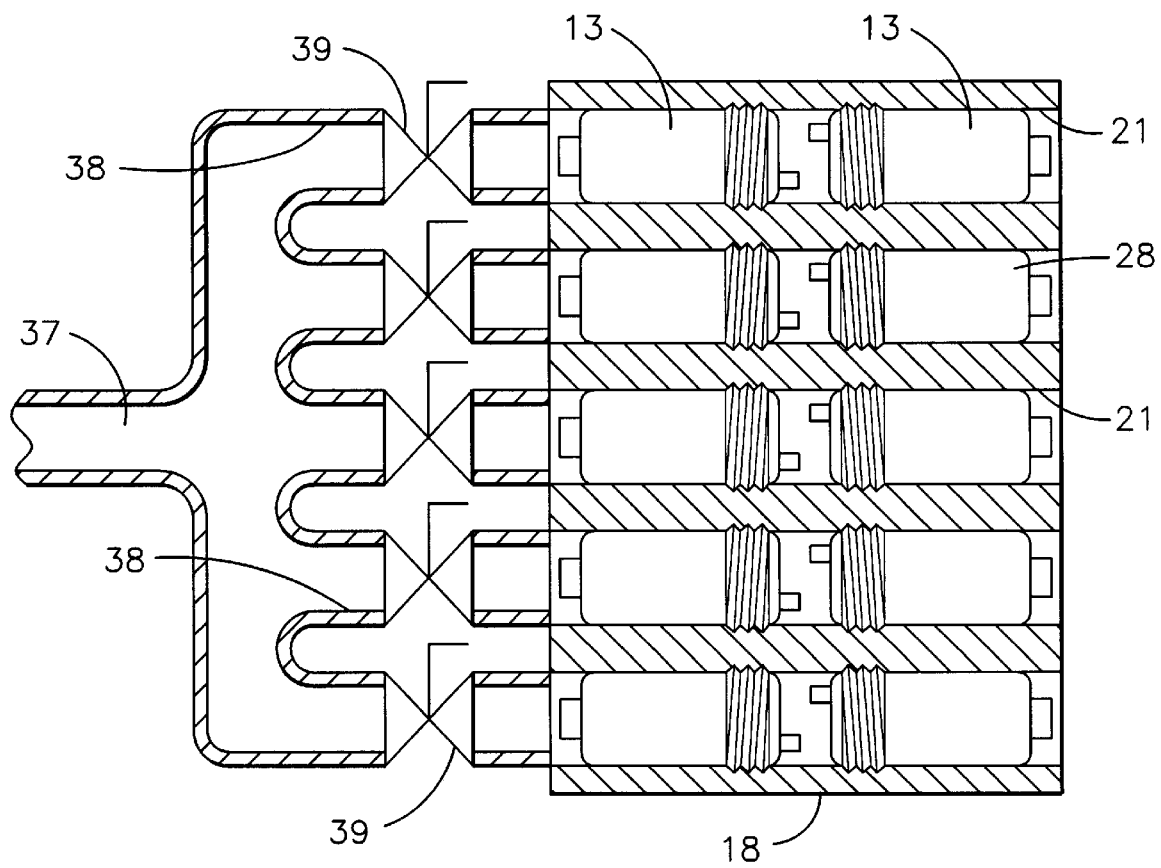
FIG. 7 is another embodiment of the automated oil filter replacement assembly.

With respect to FIG. 5, a schematic is shown illustrating the operation of the indexing drive 27 and indexing plate 22. The indexing drive 27 is preferably a magnetic coupling drive assembly which is driven by a stepping motor 34. The magnetic coupling includes a magnet 27A driven by the stepping motor 34, and a magnet 27B within housing 12. The locomotive operator remotely activates the stepping motor 34 through a control signal indicative of the magnitude of a vehicle or oil parameter detected by the sensor 43. For instance, after the locomotive has traveled a set number of kilowatt hours, the operator will need to change oil filters.

The indexing plate 22 must be rotated a given distance so portal 24 aligns with the chamber 21 and oil filter 13 to replace the previously used filter. A shutter 35 and optocoupler 36 are operationally linked with the indexing drive 27. As known in the art, the shutter 35 has windows, or slits, annularly spaced so that the spacing of the windows corresponds to the spacing of the chambers 21 on the cartridge 18. When the magnetic coupling rotates, the shutter 35 moves from one window to a next window. The window positioning within the opto-coupler generates a control signal, or position indicating signal, which causes the power system to cut off the power supply to the stepping motor 34 and to the indexing plate 22.

In operation, oil is pumped from a reservoir (not shown) into the housing 12 through the oil intake line 14. As oil is pumped into the housing 12, the oil flows through that oil filter 13 in fluid communication with the oil reservoir. The o-rings 19 extending intermediate the housing 12 and the cartridge 18 seal the housing 12, and prevent oil from bypassing the oil filter 13. In addition, the o-rings 26 between the front surface 20 of the housing and the index plate 22 provide additional sealing means within the housing 12. The oil filter 13 has a conventional canister 28 within which a filter media (not shown) is supported. An aperture 30 is on an end of the canister aligned with the portal on the index plate 22. After passing through the filter, the oil exits the housing and is directed to the diesel engine.

When a selected oil filter has reached its expected life span, the indexing drive 27 responsive to a signal, rotates indexing plate 22 from an exhausted oil filter to the next oil filter which has not been used. The installed oil filters have a known life span which may be estimated in terms of the number of miles, or kilowatt hours, traveled by a locomotive. The sequence is followed until all filters have been exhausted at which time all filters can be replaced while the locomotive undergoes routine maintenance.

When a locomotive is serviced, oil filters 13 are installed in the cartridge 18 as previously described. After the locomotive has traveled a preselected number of miles or kilowatt hours, the locomotive operator will remotely activate the indexing drive 27 which operates to rotate the indexing plate 22. The portal 24 is then moved from a first oil filter to a second oil filter, so that oil is then filtered through the second selected filter. In addition, during the course of operation of the locomotive various oil conditions and characteristics are monitored. If these conditions rise to certain condemning limits, an operator may have to change filters before the expected time period required. For example, the locomotive operating system continuously monitors the oil pressure within the oil lubrication system. The oil pressure within the system, before entering the oil filter 13, may increase significantly, and the oil pressure down line from the oil filter 13 may drop significantly. This change in oil pressure may indicate the oil filter 13 is clogged. The locomotive operator can then activate the indexing drive 27 to rotate the index plate 22 to replace the filter (or leak).

Similarly, oil lubrication systems operate under an acceptable pressure differential between oil lines entering the oil filters and lines existing the oil filter. If the pressure differential falls below that minimum level then the oil filter has likely deteriorated to such a state that the oil filter must be replaced.

The invention is not limited to this particular cartridge and housing assembly shown in FIGS. 1 through 5. Indeed, the invention may include a manifold pipe system to the cartridge 18 to direct the flow of oil to a selected oil filter 13 or filters. As shown, a cartridge 18 has a plurality of chambers 21 and filters 13 sealed within the chamber 21. An oil supply line 37 is divided into a plurality of pipes 38 where each pipe 38 directs flow of oil to a corresponding chamber 21 and oil filter 13.

A valve 39 is disposed along each pipe 38 between the oil filter 13 and oil supply line 37. During the operation of the locomotive, a single valve 39 is opened, and the remaining valves are closed, so oil flow is directed through a selected oil filter 13, or filters. Once a selected filter 13 or filters, is exhausted, a valve is closed and another valve is opened to direct oil flow through the other available unused filter 13, or filters. As the time period, or mileage of the train reaches the parameter limits, the valve 34 may be remotely opened and/or closed as required to control and redirect oil flow.

It is also contemplated that certain characteristics of the oil may be monitored, including but not limited to, the oil viscosity. For instance, a viscometer knows to measure the oil's viscosity. Oil that becomes less viscous, may indicate that the oil contains water or fuel. Water leaking into the engine could prove catastrophic. The filters are replaced as described above.

While the preferred embodiments of the present invention have been shown and described herein in the context of a locomotive having a diesel engine, it will be obvious that such embodiments are provided by way of example only and not of limitation. Numerous variations, changes and substitutions will occur to those of skilled in the art without departing from the invention herein. For example, the present invention need not be limited to diesel engines for locomotive, since other types of engines used for automotive, marine or other applications can equally benefit from the teachings of the present invention. Accordingly, it is intended that the invention be limited only by the spirit and scope of the appended claims.

What is claimed is:

1. A self-contained oil filter replacement assembly carried on a self-powered vehicle for providing filtered oil to an engine for the vehicle, comprising:
   (a) a plurality of oil filters supported on said vehicle, with at least one of said filters selected to be in fluid communication with said engine;
   (b) an oil pump, in fluid communication with said oil filters and said engine, for circulating oil to said engine through said at least one selected oil filter but not all of said plurality of oil filters;
   (c) at least one sensor for monitoring at least one operating parameter related to the operation of the vehicle and generating a signal indicative of the magnitude of said operating parameter, with the engine being effective to filter oil so long as the magnitude of the operating parameter remains within a predetermined range of values having a lower operating and an upper operating value;
   (d) fluid passage responsive to said operating parameter exceeding a predetermined limit within which said at least one selected oil filter is intended to function, for directing oil flow through at least one oil filter not previously receiving oil flow and blocking fluid flow through at least one filter previously receiving oil flow, when an operating parameter limit has been reached;
   (e) a cartridge having a plurality of chambers, and each said chamber having at least one oil filter mounted therein in sealing relationship with said chamber, said chambers constituting part of said fluid passage; and,
   (f) wherein said fluid passage includes an indexing plate mounted to said cartridge and rotatable with respect to said cartridge, and having at least one portal aligned with a chamber within which said at least one selected oil filter is supported, and said at least one selected filter being sealed from said remaining chambers and remaining oil filters.

2. A self-contained oil filter replacement assembly as defined in claim 1 further including a housing within which said cartridge is mounted in sealing relationship with said housing, and said housing having a first end in fluid communication with said oil source and a second end in fluid communication with said engine, said cartridge having a front surface facing the front end of the housing, and said indexing plate is mounted on the front surface of the cartridge.

3. A self-contained oil filter replacement assembly as defined in claim 1 wherein said fluid passage includes an indexing plate drive means, responsive to said parameter limits for driving said indexing plate.

4. A self-contained oil filter replacement assembly as defined in claim 3 wherein said drive means includes an indexing magnetic drive.

5. A self-contained oil filter replacement assembly as defined in claim 1 further including an o-ring extending around an opening in the chamber of said at least one oil filter between a front surface of the cartridge and the indexing plate.

6. A self-contained oil filter replacement assembly as defined in claim 1 further including an o-ring extending around openings of the plurality of chambers on the cartridge and disposed between a front surface of the cartridge and the indexing plate.

7. An automated oil filter replacement assembly for a locomotive diesel engine, comprising:
   (a) a housing in fluid communication with an oil source, having a front end in fluid communication with said oil source, and a rear end, in fluid communication with said engine;
   (b) a cartridge supported in said housing in sealing relationship with an interior surface of the housing, said cartridge having a front surface disposed toward the front end of the housing;
   (c) a plurality of oil filters supported within said cartridge in sealing relationship with said cartridge;
   (d) an indexing plate mounted to the front surface of the cartridge in sealing relationship therewith, and moveable with respect to said cartridge for selecting at least one said filter from said plurality of filters, and said at least one selected filter in fluid communication with said oil source and said locomotive engine; and,
   (e) an indexing drive, responsive to an operating parameter representing operating parameter limits within which said oil filters function, for driving said indexing plate when a parameter limit has been reached.

8. An automated oil filter replacement assembly for a locomotive diesel engine as defined in claim 7 wherein said indexing drive includes a magnetic indexing drive.

9. An automated oil filter replacement assembly as defined in claim 7 wherein said parameter limits include a maximum number of kilowatt hours a locomotive has traveled with said selected at least one oil filter.

10. An automated oil filter replacement assembly as defined in claim 7 wherein said parameter limits include a maximum pressure differential between oil entering said at least one selected oil filter and oil exiting said at least one selected oil filter.

11. An automated oil filter replacement assembly as defined in claim 7 wherein said parameter limits include a minimum pressure differential between oil entering said at least one selected oil filter and oil exiting said at least one selected filter.

12. An automated oil filter replacement assembly as defined in claim 11 further including an o-ring extending around an opening in a chamber within which said at least one selected oil filter is mounted, and said o-ring disposed between said front surface of the cartridge and the indexing plate.

* * * * *

UNITED STATES PATENT AND TRADEMARK OFFICE
CERTIFICATE OF CORRECTION

PATENT NO. : 6,334,950 B1
DATED : January 1, 2002
INVENTOR(S) : Frank J. Bogacki et al.

It is certified that error appears in the above-identified patent and that said Letters Patent is hereby corrected as shown below:

<u>Title page,</u>
Item [74], please add the following -- Carl A. Rowold, Esquire --

Signed and Sealed this

Eleventh Day of February, 2003

JAMES E. ROGAN
*Director of the United States Patent and Trademark Office*